United States Patent [19]

Bert et al.

[11] Patent Number: 5,502,012
[45] Date of Patent: Mar. 26, 1996

[54] FUSED CERAMIC BEADS

[75] Inventors: Christophe Bert, Caumont Sur Durance; Daniel Urffer, Morieres-Les-Avignon, both of France

[73] Assignee: Societe Europeenne Des Produits Refractaires, Courbevoie, France

[21] Appl. No.: 370,258

[22] Filed: Jan. 9, 1995

[30] Foreign Application Priority Data

Jan. 11, 1994 [FR] France ................................. 94 00209

[51] Int. Cl.⁶ .................................................. C04B 35/48
[52] U.S. Cl. ........................ 501/103; 501/104; 501/105
[58] Field of Search .................................. 501/103, 104, 501/105, 107, 152, 153, 154

[56] References Cited

U.S. PATENT DOCUMENTS

| | | | |
|---|---|---|---|
| 4,106,947 | 8/1978 | Recasens et al. | 501/107 |
| 4,430,279 | 2/1984 | Hagio et al. | 501/103 |
| 4,457,767 | 7/1984 | Poon et al. | 501/105 |
| 4,690,910 | 9/1987 | Tsukuma et al. | 501/103 |
| 4,742,030 | 5/1988 | Masaki et al. | 501/103 |
| 4,772,511 | 9/1988 | Wood et al. | 501/103 |
| 4,891,343 | 1/1990 | Quadair | 501/103 |
| 5,017,532 | 5/1991 | Sonnenberg et al. | 501/103 |
| 5,061,665 | 10/1991 | Seki et al. | 501/105 |

FOREIGN PATENT DOCUMENTS

| | | |
|---|---|---|
| 2320276 | 3/1977 | France . |
| 0018620 | 1/1985 | Japan ................................. 501/103 |
| 1072683 | 4/1986 | Japan ................................. 501/104 |
| 3008451 | 1/1991 | Japan . |
| 9118843 | 12/1991 | WIPO . |

OTHER PUBLICATIONS

Chemical Abstract 117:218573v—abstract of article to Tian, Yicheng et al., *Melt–cast zirconium–containing corundum lining bricks and balls for ball mills, and their manufacture*, 57–Ceramics, vol. 117, No. 117: 218573v, p. 413, "Ceramics" (Jun. 1992).

*Primary Examiner*—Paul Marcantoni
*Attorney, Agent, or Firm*—Watson, Cole, Grindle & Watson

[57] ABSTRACT

The invention relates to fused ceramic beads, which have the following chemical composition in % by weight on the basis of the oxides:

40 to 95% of $ZrO_2$ and $HfO_2$;

at least one of $Y_2O_3$ and $CeO_2$, with the provisos that $Y_2O_3$, when present, represents 0.1 to 10% and $CeO_2$, when present, represents 1 to 25%, the total of $Y_2O_3$ and $CeO_2$ representing 0.1 to 25%;

a quantity of $SiO_2$ representing 10 to 45% of the composition when $CeO_2$ is absent from the composition and 0.5 to 45% when $CeO_2$ is present in the composition. Application to grinding and to dispersion in wet medium is provided.

24 Claims, No Drawings

FUSED CERAMIC BEADS

FIELD OF THE INVENTION

The invention relates to fused ceramic beads usable in particular in equipment and processes for microgrinding and microdispersion in wet medium.

BACKGROUND OF THE INVENTION

The equipment and processes for microgrinding and microdispersion in wet medium are now well known and developed in industries such as:
  the mineral industry: fine grinding of particles preground by using traditional processes (in the case of calcium carbonate, titanium oxide, gypsum, kaolin, iron ore and the like)
  the industries of paints and inks, dyes, magnetic lacquers and agrochemical compounds, for the dispersion and homogenization of the various liquid and solid constituents.

In most cases this equipment and these processes employ dispersing or grinding media of spherical shape and of small diameter (for example beads from 0.3 to 4 mm).
  Briefly, these beads must have the following properties:
  chemical and colour inertness towards the processed products,
  mechanical impact strength
  wear resistance
  low abrasiveness for the hardware (stirring members, vessels and the like)
  high density for a good grinding efficiency
  low open porosity for easy cleaning.

From a practical view point, a limited number of dispersing or grinding media are found on the market:
  round-grained sand
  glass beads
  metal beads
  sintered ceramic beads
  fused ceramic beads.

Round-grained sand (for example Ottawa sand) is a natural and cheap product. Although used originally, it is employed less and less because it is not suited to modern (pressurized and high-throughput) mills. The sand is actually low in strength, of low density, variable in quality, and is abrasive towards the hardware.

Glass beads have gradually replaced sand as a result of their obvious advantages over the latter: better strength, lower abrasiveness, availability in a wider range of diameters.

Glass beads are widely employed at present, but a demand has appeared for grinding and dispersing media of higher performance: beads of higher impact strength and wear resistance and which are more efficient (denser).

Steel beads, known for a long time, provide a partial answer to this problem, but their use remains marginal for the following reasons:
  insufficient inertness towards the processed products (contamination of inorganic fillers, greying of paints and the like)
  excessively high density, requiring special mills (high energy usage, heating, (mechanical stressing of the hardware).

Ceramic beads are also known. These beads have a better strength than glass beads, a higher density and an excellent chemical inertness. The following may be distinguished:
  sintered ceramic beads obtained by a cold forming of ceramic powder and consolidation by firing at high temperature; and
  "fused" ceramic beads, that is to say beads obtained by melting ceramic components at very high temperature, forming spherical droplets and solidifying.

The great majority of fused beads have a composition of the zirconia-silica ($ZrO_2$—$SiO_2$) type in which the zirconia is crystallized in monoclinic form and the silica (and any additives) forms a glassy phase. These fused ceramic beads have a mixed structure—intimately intermixed crystalline phase and glassy phase—which gives them a low abrasiveness towards the grinding hardware, while permitting optimum grinding properties (mechanical strength, high density, chemical inertness). This glassy phase occupies a volume which is always markedly greater as a percentage than the weight percentage of silica introduced.

A wide range of fused ceramic beads for grinding and dispersion is described in FR-A 2 320 276 or U.S. Pat. No. 4,106,947. This patent covers a wide range of $ZrO_2$—$SiO_2$ compositions and describes the influence of the additional oxides $Al_2O_3$, $Na_2O$, MgO and CaO.

Although the various fused ceramic beads of the prior art are of good quality, industry always requires products of ever better quality.

SUMMARY OF THE INVENTION

The invention is aimed at satisfying this requirement by providing beads made of fused ceramic material of a quality that is superior when compared with the beads of the prior art and which are particularly useful as dispersing or grinding media.

More precisely, the invention relates to fused ceramic beads (i.e. beads formed by melting a batch of raw materials, converting the molten material obtained into beads of spherical general shape and solidifying them), said beads having the following chemical composition, in % by weight on the basis of the oxides:
  40 to 95% of $ZrO_2$ and $HfO_2$;
  at least one of the additional oxides $Y_2O_3$ and $CeO_2$, with the provisos that $Y_2O_3$, when present, represents 0.1 to 10% and $CeO_2$, when present, represents 1 to 15%, the total of $Y_2O_3$ and $CeO_2$ representing 0.1 to 25%;
  a quantity of $SiO_2$ representing 10 to 45% of the composition when $CeO_2$ is absent from the composition and 0.5 to 45% when $CeO_2$ is present in the composition.

When reference is made to $ZrO_2$ below, this should be understood as ($ZrO_2$+$HfO_2$). In fact, a little $HfO_2$, chemically inseparable from $ZrO_2$, and with similar properties, is always present besides $ZrO_2$, as this is well known.

Preferably, $Y_2O_3$, when present, represents at least 0.7% by weight.

When $Y_2O_3$ is used, at least 0.1% by weight thereof is required for achieving a noticeable improvement. An amount of 10% by weight of $Y_2O_3$ suffices to convert all the present zirconia into the cubic state. Above 10% by weight, excess $Y_2O_3$ does not improve further the mechanical strength and other indesirable crystalline phases can appear.

$Y_2O_3$ is the preferred additional oxide, when only beads having a high strength are sought.

The addition of $CeO_2$ is to be selected, however, when beads having a high density, in addition to a high strength, are sought. For achieving a noticeable density increase, at least 1% by weight of $CeO_2$ is required. An amount of 14% by weight of $CeO_2$ suffices to convert all the present zirconia into the cubic state. Above 15% by weight of $CeO_2$, excess $CeO_2$ does not improve further the mechanical strength and additional indesirable crystalline phases can appear.

At least 10% by weight of $SiO_2$ is required for producing beads of suitable compactness when $CeO_2$ is absent. When $CeO_2$ is present, the amount of $SiO_2$ can be decreased to a minimum of 0.5% by weight, depending upon the $CeO_2$ amount, of course. $SiO_2$ cannot exceed 45% by weight without excessively degrading the refractory properties of the beads.

As to $ZrO_2$, at least 40% is weight are required for producing beads having good mechanical properties, but no more than 95% by weight is allowed for reasons of manufacture ability.

For economic reasons, the percentage of $ZrO_2$ in the composition is preferably higher than 65% and the weight ratio $ZrO_2/SiO_2$ is higher than 2.

In addition, the composition may optionally include one or more of the following oxides:

rare-earth oxides associated in natural ores containing $Y_2O_3$ and/or $CeO_2$ (in the case of use of more economical impure raw materials): from 0 to 10%

$Al_2O_3$ in a proportion such that the weight ratio $Al_2O_3/SiO_2$ has a value of 0 to 1.5

$Na_2O$ in a proportion such that the weight ratio $Na_2O/SiO_2$ has a value of 0 to 0.04

MgO in a proportion such that the weight ratio $MgO/SiO_2$ has a value of 0 to 1

CaO in a proportion such that the weight ratio $CaO/SiO_2$ has a value of 0 to 1.45.

The total of the optional oxides $Al_2O_3$, $Na_2O$, MgO and CaO must not exceed 20% by weight of the total of the composition. This maximum threshold is necessary in order that the additional oxides specific to the invention ($Y_2O_3$ and $CeO_2$) may play a significant part in the quality of the fused beads.

DETAILED DESCRIPTION OF THE INVENTION

The present invention relates to fused compositions of the $ZrO_2$—$SiO_2$ type which contain at least one additional oxide which, surprisingly, provides special advantages. This oxide is chosen from yttrium oxide ($Y_2O_3$) and cerium oxide ($CeO_2$), optionally associated with other rare-earth oxides present in the raw materials.

This or these additional oxides provide advantages both in the manufacture of the fused beads and in their application.

The addition of the oxides $Y_2O_3$ or $CeO_2$ modifies the state of the fused material especially in the direction of lower viscosity; as a result it becomes much easier to cast and disperse compositions of $ZrO_2$—$SiO_2$ type, even when very rich in zirconia. This addition also results in a better release of the gases which may be dissolved in the molten material during the melting and processing period. Fewer gas bubbles and hence fewer porous beads will therefore be found in the finished product.

Like many fused oxides, the $ZrO_2$—$SiO_2$ compositions undergo shrinkage on solidifying (contraction linked with the density of the solid being higher than that of the corresponding liquid). In the case of a very short solidification interval (for example pure zirconia) the solidification of the droplets of dispersed liquid produces a cavity in the centre of the beads (large porosity called shrinkage hole), potentially highly detrimental to the strength of the beads. By adding $Y_2O_3$ or $CeO_2$, and particularly with $CeO_2$, it is possible to cast compositions which are very rich in $ZrO_2$ (>85% by weight) without the appearance of any shrinkage hole in the beads. In the $ZrO_2$—$SiO_2$ system the compositions which are rich in $ZrO_2$ are denser, and this is favourable for the grinding efficiency of the beads produced.

In solidified beads of the $ZrO_2$—$SiO_2$—$Y_2O_3$ or $ZrO_2$—$SiO_2$—$CeO_2$ system the yttrium or cerium oxide is partitioned between the crystalline zirconia and the glassy phase. The zirconia is chiefly in tetragonal, and sometimes cubic, form, depending on the content of $Y_2O_3$ or $CeO_2$ introduced. This is a great difference when compared with the prior patents relating to the fused $ZrO_2$—$SiO_2$ compositions, in which the zirconia remains very predominantly monoclinic (a little cubic zirconia appears with MgO).

The tetragonal form is the most dense of the three allotropic varieties of zirconia (density 6.1 against 5.9 in the case of cubic zirconia and 5.8 in the case of monoclinic zirconia); in addition, it has a mechanical reinforcing effect on the matrix in which it is to be found.

The proportion of the oxides $Y_2O_3$ and $CeO_2$ which is not bound in the zirconia returns into the constitution of the glassy silicate phase, also with a favourable effect on density and mechanical strength.

To sum up, the addition of yttrium oxide or of cerium oxide makes it possible, in the fused $ZrO_2$—$SiO_2$ beads:

to decrease the porosity defects (shrinkage holes or bubbles)

to obtain denser beads to obtain beads with higher impact strength and wear resistance.

Considerable progress is therefore involved when compared with the fused ceramic beads known hitherto, and these make the beads of the invention very useful in wet grinding and dispersion applications.

It is of interest to note that most of the compositions employed in the invention can be obtained from natural zircon sand ($ZrSiO_4$), which analyses at approximately 66% of $ZrO_2$ and 33% $SiO_2$ (+impurities). The use of zircon sand as raw material for the manufacture of the beads of the invention is highly advantageous from the view point of economy and is therefore preferred.

The adjustment of the compositions can be made by adding pure oxides or mixtures of oxides ($ZrO_2$, $SiO_2$, $Y_2O_3$, $CeO_2$ and the like). In particular, the addition of Ce oxide can be made using rare-earth mixed oxide concentrates (elements of atomic No. 57 to 71).

It is known that melting zircon in reducing conditions makes it possible to eliminate all or part of the silica ($SiO_2$). This manner of operation is much more economical than an addition of $ZrO_2$, which is high in price.

It may also be noted that alkali or alkaline-earth metal oxides ($Na_2O$, MgO, CaO) may be introduced by economically employing carbonates or hydrates as raw materials.

With the exception of silica, which can be reduced, of volatile oxides (alkali or even alkaline-earth metal oxides) and of the non refractory radicals ($CO_2$ in the case of carbonates, $H_2O$ in the case of hydrates), the chemical analysis of the fused beads is substantially identical with that of the starting composition.

The manufacture of the beads of the invention is carried out in a conventional manner. The starting batch made up of the indicated oxides or of their precursors may be fused in an electrical furnace or other suitable fusing device. A thin stream of molten material is dispersed into small particles which, as a result of the surface tension, adopt the spherical shape. This dispersion may be produced by blowing (air, steam, etc.) or by any other process for spraying a molten material, known to a person skilled in the art. Beads from 0.1 to 4 mm in diameter can thus be produced.

The beads of the invention are particularly well suited as media for grinding and dispersion in wet medium. It may be noted, however, that their properties (strength, density, ease of preparation etc.) may make them suitable for other applications of ceramic beads: media for dry milling, for shotblasting, for propping, for heat exchange and the like.

The following nonlimiting examples are given with the aim of illustrating the invention.

The following methods have been employed to determine certain characteristics of the beads.

Inspection of Polished Section

A few grams of beads of the same diameter are positioned in the same plane and embedded in a thermosetting resin. The small part obtained is milled so as to obtain sections of the beads in a median plane. This preparation is sufficient for observing the porosity, the shrinkage cavities and any cracks present. A compactness value is defined as the percentage of beads exhibiting no porosities or cavities visible with a binocular magnifier (for example by counting out of 200 2-mm beads).

To observe the crystalline structure it is desirable to perform a polishing of the milled sections, for example using diamond paste.

X-ray Phase Analysis

Radiocrystallographic analysis using X-ray diffraction is a well-known method for measuring the crystalline phases present qualitatively or approximately quantitatively.

In the case of the beads this analysis is carried out on a polished section as defined above.

Crushing Strength

For each bead composition 20 to 100 beads of the same diameter and of good sphericity are selected and are subjected one by one to a crushing test between the two pistons of a press. For the comparison to be possible the test must be performed on beads of the same diameter, usually 2 mm. The crushing strength is the mean of the values obtained.

Apparent Density

The apparent density of the beads is measured with cold water using a pycnometer according to a hydrostatic method based on Archimedean buoyancy.

Test for Behaviour in a Laboratory Mill

This is a more complex test than the preceding ones, but it represents an excellent simulation of the actual behaviour in service in the grinding application.

A horizontal pressurized mill of 1.2-1 capacity is filled with 1 l (apparent volume) of the beads to be tested (that is 83.3% filling ratio). A usual particle size cut is kept for comparison (for example 0.8 to 1.25 mm).

The stirring members consist of metal discs which are eccentric in relation to the axis of rotation revolving at 2750 rev/min, that is a peripheral disc velocity of 10 m/s.

The suspension to be ground is a concentrated zirconia powder suspension at a concentration of 60% in water (6 kg of powder per 4 kg of water). This suspension is conveyed through the mill by a peristaltic pump at a flow rate of 6 l/h.

The following can be assessed at the end of the test:

- the grinding efficiency, using the reduction in diameter of the ground powder
- the wear on hardware, using the loss in weight of the stirring discs
- bead wear using the loss in weight of the charge of grinding media.

EXAMPLES 1 to 6

Beads of Economical Composition

The following are employed in these examples, with the aim of obtaining improved fused beads but at a low cost:

a zircon-based composition an addition of yttrium oxide of less than 2%.

A pulverulent composition consisting of zircon sand is introduced into an Héroult-type electric arc furnace for melting oxides. A number of melting/casting cycles are performed while progressively adding to the composition yttrium oxide of ordinary quality (99.9% $Y_2O_3$) in a proportion arising from 0 to 2%. The fused product is dispersed into beads by blowing with compressed air and is isolated casting by casting.

This technique makes it possible to have available a number of batches of beads of different composition, which can be characterized according to the methods described above.

The results obtained are summarized in the following table:

| Example | Chemical analyses of the cast product | | | | Compactness | Crushing |
| | $ZrO_2$ (+$HfO_2$) | $SiO_2$ | $Y_2O_3$ | Others | % of zirconia in tetragonal form | of the beads (2 mm) | strength (2-mm beads) |
| --- | --- | --- | --- | --- | --- | --- | --- |
| Reference | 68% | 31% | <0.1% | 1% | <5% | 90% | 80 kgf |
| 1 | 67.5% | 30.8% | 0.7% | 1% | 7% | 94% | 90 kgf |
| 2 | 67.3% | 30.7% | 1% | 1% | 10% | 95% | 95 kgf |

-continued

| | Chemical analyses of the cast product | | | | % of zirconia in tetragonal form | Compactness of the beads (2 mm) | Crushing strength (2-mm beads) |
| --- | --- | --- | --- | --- | --- | --- | --- |
| Example | $ZrO_2$ (+$HfO_2$) | $SiO_2$ | $Y_2O_3$ | Others | | | |
| 3 | 67.2% | 30.6% | 1.2% | 1% | 12% | 96% | 105 kgf |
| 4 | 67.1% | 30.5% | 1.4% | 1% | 13% | 97% | 110 kgf |
| 5 | 66.8% | 30.4% | 1.8% | 1% | 15% | 98% | 115 kgf |
| 6 | 66.7% | 30.3% | 2.0% | 1% | 18% | 98% | 120 kgf |

The superiority of the beads according to the invention (1 to 6) is clearly seen in this table when compared with the reference composition (outside the scope of the invention).

The apparent density of the beads increases steadily from 3.8 to 3.9 on moving from the reference example to Example 6. All these products contain approximately 50% by volume of glassy phase.

The results of the reference examples and of Examples 1 to 6 can be compared because they are obtained under fixed melting/dispersion conditions.

As in the examples which follow, these are conditions known to a person skilled in the art, enabling correct fused beads to be obtained industrially.

For good understanding of the results it must also be noted that the compactness and the crushing strength of the beads are two partially independent characteristics.

The compactness of the solidified beads can, for example, be improved by removing porous beads by a densimetric selection technique, but this gives little improvement in the mean crushing strength.

EXAMPLE 7 and 8

Beads of High Strength For Grinding

In these examples attempts are made to obtain beads of the highest possible strength for the grinding application.

This consideration takes precedence here over cost considerations (cf. Examples 1 to 6 and 10/11) and over obtaining a maximum density (cf. Example 9).

To obtain a maximum strength in the grinding application the silica content is decreased in comparison with Examples 1 to 6 (decrease in the mechanically weak glassy phase).

It has become apparent, however, that a minimum of 10% of $SiO_2$ is needed to obtain correct compactness values in the case of beads according to the invention without $CeO_2$.

In Examples 7 and 8 a minimum content of 15% $SiO_2$ is maintained with a twin objective:

to obtain a quantity of glassy phase which is sufficient to bind the zirconia crystals properly to avoid an excessively high density which promotes self-wear of the beads in the mills.

A pulverulent composition consisting of the following is introduced into an Héroult-type electric arc furnace for melting oxides:

61% of zircon sand, 32.5% of technical zirconia (99% $ZrO_2$) and 6.5% of yttrium oxide in the case of Example 7

46% of zircon sand, 46.5% of technical zirconia and 7.5% of yttrium oxide in the case of Example 8.

The molten product is dispersed into beads and characterized by the methods described earlier.

| | Chemical analyses of the cast product | | | | % of zirconia in tetragonal or cubic form | Compactness of the beads (2 mm) | Crushing strength (2-mm beads) |
| --- | --- | --- | --- | --- | --- | --- | --- |
| Example | $ZrO_2$ (+$HfO_2$) | $SiO_2$ | $Y_2O_3$ | Others | | | |
| 7 | 72.5% | 20% | 6.5% | 1% | 100% | 98% | 180 kgf |
| 8 | 76.5% | 15% | 7.5% | 1% | 100% | 98% | 200 kgf |

In these two examples, which are of particular interest for grinding, we have employed the test for behavior in a laboratory mill on 0.8 to 1.25 mm beads.

The beads in these two examples were compared with two reference products outside the scope of the invention:

fused beads of the reference example defined earlier good quality sintered beads made of zirconia partially stabilized with magnesia (96% $ZrO_2$- 3% MgO-1% various oxides).

| | Apparent density of beads | Reduction in the median diameter of the ground product final $d_{50}$/initial $d_{50}$ | Disc wear (%/h) | Bead wear (%/h) |
| --- | --- | --- | --- | --- |
| reference | 3.8 | 0.39 | 0.12 | 0.51 |
| 7 | 4.5 | 0.38 | 0.27 | 0.20 |
| 8 | 4.7 | 0.37 | 0.40 | 0.15 |
| sintered Mg - PSZ beads | 5.6 | 0.34 | 0.41 | 0.26 |

It is clearly apparent that the fused beads according to the invention make it possible to improve the grinding efficiency and to decrease the usage of grinding media, when compared with the reference fused beads.

However, these improvements are accompanied by an increase in abrasiveness towards the hardware, which can reach that of sintered zirconia beads. Taking this point of view into account, it may be considered that Example 7 is a better compromise than Example 8.

EXAMPLE 9

Beads of Very High Density

For particular applications it may be advantageous to have available ceramic beads of very high density (grinding of very viscous suspensions or of very tough products, search for dense nonmetallic shot, search for a high heat capacity for heat exchangers and the like).

In this example an attempt is made therefore to obtain a maximum density even though it may be at the cost of the strength of the beads.

A pulverulent composition consisting of 86% of technical zirconia (99% $ZrO_2$-0.5% $SiO_2$-0.5% of other oxides) and 14% of industrial cerium oxide (99.9% $CeO_2$) is introduced into an Heroult-type electric arc furnace for melting oxides.

The molten product is dispersed into beads and characterized according to the defined methods:

| Example | Chemical analyses of the cast product | | | | % of zirconia in tetragonal or cubic form | Compactness of the beads (2 mm) | Crushing strength (2-mm beads) |
|---|---|---|---|---|---|---|---|
| | $ZrO_2$ (+$HfO_2$) | $CeO_2$ | $SiO_2$ | Others | | | |
| 9 | 85% | 14% | 0.5% | 0.5% | 100% | 90% | 80 kgf |

The advantage of this composition arises from the apparent density of the beads which here reaches a new record of 6.1. Cerium oxide therefore makes it possible to decrease, in an extreme manner, the quantity of silica in the fused beads (and hence the quantity of glassy phase of low density), while maintaining acceptable compactness and strength.

EXAMPLES 10 and 11

Grinding Beads of High Strength, Containing a Number of Additional Oxides

In these examples it is shown that it is possible to obtain milling beads of high strength by introducing a number of additional oxides (on the one hand $Y_2O_3$ and $CeO_2$, on the other hand $Y_2O_3$ and MgO) into the same composition.

This method may prove economical as a function of the cost, linked with the economy, of raw materials containing $Y_2O_3$ or $CeO_2$.

A pulverulent composition consisting of the following is introduced into an electric arc furnace for melting oxides:

54% of zircon sand, 33% of technical zirconia (99% $ZrO_2$), 3% of yttrium oxide and 10% of cerium oxide in the case of Example 10

56% of zircon sand, 38% of technical zirconia, 3% of yttrium oxide and 3% of magnesium oxide in the case of Example 11.

The molten product is dispersed into beads and characterized according to the methods described previously.

| Example | Chemical analysis of the cast product | | | | | | % of zirconia in tetragonal or cubic form | Compactness of the beads (2 mm) | Crushing strength (2 mm) |
|---|---|---|---|---|---|---|---|---|---|
| | $ZrO_2$ (+$HfO_2$) | $SiO_2$ | $Y_2O_3$ | $CeO_2$ | MgO | Other | | | |
| 10 | 68.5% | 17.5% | 3% | 10% | . | 1% | 100% chiefly tetragonal | 98% | 180 kgf |
| 11 | 74.5% | 18.5% | 3% | . | 3 | 1% | 100% chiefly cubic | 98% | 160 kgf |

The beads of Example 10 are closely related to the high-strength beads of Example 7. Cerium oxide partially replaces yttrium oxide; however, a greater mass of cerium is needed.

In Example 11 the beads are slightly less strong than those of Examples 7, 8 or 10. However, they are beads of good quality when compared with the known fused compositions, and less costly than the beads improved solely using $Y_2O_3$ or $CeO_2$.

We claim:

1. Fused ceramic beads comprising intermixed zirconia crystals bonded with a glassy silicate phase, and having the following chemical composition in % by weight on the basis of the oxides:

40 to 95% $ZrO_2$ and $HfO_2$;

0.1 to 10% $Y_2O_3$; and 10 to 45% $SiO_2$.

2. Beads according to claim 1, wherein the weight percentage of $ZrO_2$ is greater than 65% of said composition and the $ZrO_2$/$SiO_2$ ratio is greater than 2.

3. Beads according to claim 1, comprising at least 15 % by weight $SiO_2$ and at least 6.5% by weight $Y_2O_3$.

4. Beads according to claim wherein said composition comprises less than 2% by weight $Y_2O_3$.

5. Beads according to claim 1, further comprising at least one other rare-earth oxide selected from the group consisting of oxides of the elements having atomic numbers of from 57 to 71, excluding 58, in the Periodic Table Of The Elements, wherein said other rare-earth oxides comprise 10% by weight or less of the composition.

6. Beads according to claim 1, further comprising at least one of the following other oxides:

$Al_2O_3$ in a proportion such that the weight ratio of $Al_2O_3/SiO_2$ has a value of from 0 to 1.5;

$Na_2O$ in a proportion such that the weight ratio of $Na_2O/SiO_2$ has a value of from 0 to 0.04;

MgO in a proportion such that the weight ratio of $MgO/SiO_2$ has a value of from 0 to 1; and CaO in a proportion such that the weight ratio of $CaO/SiO_2$ has a value of from 0 to 1.45, wherein the sum of said other oxides is 20% by weight or less of said composition.

7. Beads according to claim 1, wherein the average diameter of said beads is between 0.1 and 4 mm.

8. A grinding process wherein beads defined in claim 1 are used as a grinding media in a wet medium.

9. A dispersing process wherein beads defined in claim 1 are used as a dispersing media in a wet medium.

10. Fused ceramic beads comprising intermixed zirconia crystals bonded with a glassy silicate phase, and having the following chemical composition in % by weight on the basis of the oxides:

40 to 95% $ZrO_2$ and $HfO_2$;

1 to 15% $CeO_2$; and 0.5 to 45% $SiO_2$.

11. Beads according to claim 10, wherein the weight percentage of $ZrO_2$ is greater than 65% of said composition and the $ZrO_2/SiO_2$ ratio is greater than 2.

12. Beads according to claim 10, wherein the density of said beads is at least 6.1 and $CeO_2$ comprises at least 14% by weight of said composition.

13. Beads according to claim 10, further comprising at least one other rare-oxide selected from the group consisting of oxides of the elements having atomic numbers of from 57 to 71, excluding 58, in the Periodic Table Of The Elements, wherein said other rare-earth oxides comprise 10% by weight or less of the composition.

14. Beads according to claim 10, further comprising at least one of the following other oxides:

$Al_2O_3$ in a proportion such that the weight ratio of $Al_2O_3/SiO_2$ has a value of from 0 to 1.5;

$Na_2O$ in a proportion such that the weight ratio of $Na_2O/SiO_2$ has has a value of from 0 to 0.04;

MgO in a proportion such that the weight ratio of $MgO/SiO_2$ has a value of from 0 to 1; and CaO in a proportion such that the weight ratio of $CaO/SiO_2$ has a value of from 0 to 1.45, wherein the sum of said other oxides is 20% by weight or less of said composition.

15. Beads according to claim 10, wherein the average diameter of said beads is between 0.1 and 4 mm.

16. A grinding process wherein beads defined in claim 10 are used as a grinding media in a wet medium.

17. A dispersing process wherein beads defined in claim 10 are used as a dispersing media in a wet medium.

18. Fused ceramic beads comprising intermixed zirconia crystals bonded with a glassy silicate phase, and having the following chemical composition in % by weight on the basis of the oxides:

40 to 95% $ZrO_2$ and $HfO_2$;

a total of from 0.1 to 25% $Y_2O_3$ and $CeO_2$, including 0.1 to 10 $Y_2O_3$ when $Y_2O_3$ is present, and 1 to 15% $CeO_2$ when $CeO_2$ is present; and 0.5 to 45% $SiO_2$.

19. Beads according to claim 18, wherein the weight percentage of $ZrO_2$ is greater than 65% of said composition and the $ZrO_2/SiO_2$ ratio is greater than 2.

20. Beads according to claim 18, further comprising at least one other rare-earth oxide selected from the group consisting of oxides of the elements having atomic numbers of from 57 to 71, excluding 58, in the Periodic Table Of The Elements, wherein said other rare-earth oxides comprise 10% by weight or less of said composition.

21. Beads according to claim 18, further comprising at least one of the following other oxides:

$Al_2O_3$ in a proportion such that the weight ratio of $Al_2O_3/SiO_2$ has a value of from 0 to 1.5;

$Na_2O$ in a proportion such that the weight ratio of $Na_2O/SiO_2$ has a value of from 0 to 0.04;

MgO in a proportion such that the weight ratio of $MgO/SiO_2$ has a value of from 0 to 1; and CaO in a proportion such that the weight ratio of $CaO/SiO_2$ has a value of from 0 to 1.45, wherein the sum of said other oxides comprises 20% by weight or less of said composition.

22. Beads according to claim 18, wherein the average diameter of said beads is between 0.1 and 4 mm.

23. A grinding process wherein beads defined in claim 18 are used as a grinding media in a wet medium.

24. A dispersing process wherein beads defined in claim 18 are used as a dispersing media in a wet medium.

* * * * *